(12) United States Patent
Win et al.

(10) Patent No.: US 10,228,448 B2
(45) Date of Patent: Mar. 12, 2019

(54) VARIABLE RESOURCE ALLOCATION FOR LOCALIZATION

(71) Applicants: Moe Z. Win, Framingham, MA (US); Wenhan Dai, Cambridge, MA (US); Yuan Shen, Allston, MA (US)

(72) Inventors: Moe Z. Win, Framingham, MA (US); Wenhan Dai, Cambridge, MA (US); Yuan Shen, Allston, MA (US)

(73) Assignee: Massachusettts Institute of Technology, Cambridge, MA (US)

( * ) Notice: Subject to any disclaimer, the term of this patent is extended or adjusted under 35 U.S.C. 154(b) by 322 days.

(21) Appl. No.: 15/062,586

(22) Filed: Mar. 7, 2016

(65) Prior Publication Data

US 2017/0123040 A1    May 4, 2017

Related U.S. Application Data

(60) Provisional application No. 62/294,002, filed on Feb. 11, 2016, provisional application No. 62/247,871, filed on Oct. 29, 2015.

(51) Int. Cl.
  *G01S 5/14*    (2006.01)
  *G01S 5/02*    (2010.01)

(52) U.S. Cl.
  CPC ............. *G01S 5/14* (2013.01); *G01S 5/0278* (2013.01)

(58) Field of Classification Search
  CPC ..... G01S 5/06; G01S 5/04; G01S 5/02; G01S 5/021; G01S 5/0221
  (Continued)

(56) References Cited

U.S. PATENT DOCUMENTS

| | | |
|---|---|---|
| 7,821,453 B2 | 10/2010 | Wu et al. |
| 8,131,326 B2 | 3/2012 | Persico |

(Continued)

FOREIGN PATENT DOCUMENTS

CN        101237366        8/2008

OTHER PUBLICATIONS

Chen et al., "Power Management Game for Cooperative Localization in Asynchronous Networks," 2015 IEEE International Conference on Communications (ICC), Jun. 8-12, 2015, pp. 1506-1511.

(Continued)

*Primary Examiner* — Harry K Liu
(74) *Attorney, Agent, or Firm* — Occhiuti & Rohlicek LLP

(57) ABSTRACT

A method for localizing one or more devices in an environment make use of repeated allocation of resources for one or more sensor measurements. Each sensor measurement is characterized by the amount of resources allocated to the measurement, by a quality factor, and by direction-dependent characteristics of information that is obtainable from that sensor measurement. Knowledge of a current location of each of the one or more devices determined from past sensor measurements is characterized by a distribution, with each of the distribution containing information about the current location of the device, including the direction-dependent information and the uncertainty of the location. The allocation of resources makes use of the quality factors and direction-dependent characteristics of the sensor measurements, in combination with the distributions characterizing the current location of each of the one or more devices to allocate a variable amount of a resource to each of the one or more sensor measurements.

23 Claims, 2 Drawing Sheets

(58) Field of Classification Search
USPC .......................................................... 342/465
See application file for complete search history.

(56) References Cited

U.S. PATENT DOCUMENTS

| | | | |
|---|---|---|---|
| 8,472,973 | B2 | 6/2013 | Lin et al. |
| 9,020,523 | B2 | 4/2015 | Moeglein et al. |
| 2002/0055362 | A1 | 5/2002 | Aoyama |
| 2008/0268873 | A1 | 10/2008 | Wymeersch et al. |
| 2013/0179075 | A1* | 7/2013 | Haverinen ............. G01C 21/08 701/525 |
| 2013/0225200 | A1 | 8/2013 | Ben Hamida et al. |
| 2014/0018095 | A1* | 1/2014 | Parvizi .................. H04W 4/025 455/456.1 |
| 2014/0141796 | A1* | 5/2014 | Marti .................... G01S 5/0252 455/456.1 |
| 2015/0356332 | A1* | 12/2015 | Turner ............... G06K 7/10306 340/10.5 |

OTHER PUBLICATIONS

Dai et al., "Distributed Power Allocation for Cooperative Wireless Network Localization," IEEE JSAC vol. 33, No. 1, Jan. 2015, pp. 28-40.
Dai et al., "Network Navigation Algorithms with Power Control," 2015 IEEE International Conference on Wireless Communications and Networking Conference (WCNC), Mar. 9-12, 2015, pp. 1231-1236.
Dai et al., "Energy Efficient Network Navigation Algorithms," IEEE J. Selected Areas in Communication (JSAC), vol. 33, No. 7, Jul. 2015, pp. 1418-1430.
Huber et al., "Probabilistic Framework for Sensor Management," Dissertation, Universitätsverlag Karlsruhe, 2009 (all pages).
Huber et al., "On Multi-Step Sensor Scheduling via Convex Optimization," arXiv:1203.6754v1, Mar. 30, 2012 (all pages).
Kuwertz et al., "Multi-Step Sensor Management for Localizing Movable Sources of Spatially Distributed Phenomena," Aug. 2010, 13th Conference on Information Fusion (FUSION), pp. 1-8.
Li et al., "Robust Power Allocation for Energy-Efficient Localization-Aware Networks Networking," IEEE/ACM Transactions on Networking, vol. 21, No. 6, pp. 1918-1930, Dec. 2013.
Shen et al., "Fundamental Limits of Wideband Localization—Part I: A General Framework," arXiv:1006.08881, Jun. 4, 2010 (all pages).
Shen et al., "Power Optimization for Network Localization," IEEE/ACM Transactions on Networking, Aug. 2014, pp. 1337-1350.
Williams, "Information Theoretic Sensor Management," 2007 (all pages).

\* cited by examiner

VARIABLE RESOURCE ALLOCATION FOR LOCALIZATION

CROSS-REFERENCE TO RELATED APPLICATIONS

This application claims the benefit of U.S. Provisional Application No. 62/247,871, filed Oct. 29, 2015, titled "Energy-Efficient Wireless Localization Systems," and U.S. Provisional Application No. 62/294,002, filed Feb. 11, 2016, titled "Variable Resource Allocation for Localization Measurement," which are incorporated herein by reference.

FEDERAL SPONSORSHIP

This invention was made with government support under grant N00014-11-1-0397 awarded by the Office of Naval Research (ONR). The government has certain rights in the invention.

PRIOR DISCLOSURES BY INVENTOR

Dai et al., Energy Efficient Network Navigation Algorithm, IEEE J. Selected Areas in Communication (JSAC), Vol. 33, No. 7, July 2015, pp. 1418-1430.

Dai et al., Network Navigation algorithms with power control, IEEE International Conference on Wireless Communications and Networking Conference (WCNC), 9-12 March 2015, pp. 1231-1236.

BACKGROUND

This invention relates to allocation of resources for localization measurements, for example, for navigation.

A number of localization and navigation systems make use of measurements, for instance range measurements, that provide information enabling inference of the location of one or more devices in an environment. An example of a system that uses range measurements is the Global Positioning System (GPS) in which the range differences (or equivalently propagation time differences) from a number of satellites are used to infer the location of the GPS receiver. Localization in more limited environments may make use of range measurements between a set of fixed anchors and a set of agents (e.g., robots, personal electronic devices, manned or unmanned vehicles, etc.) in order to infer the locations of the agents relative to the fixed anchors.

In general, making a set of one or more range measurements consumes resources. For example, in the case of radio frequency based range measurement, transmission of a ranging signal may consume battery power. When there is a set of range measurements that could be made, it is possible to select a subset or sequence of the range measurements that will be most informative with regard to the inferring position of one or more agents being localized.

SUMMARY

Sensor measurement may consume a variety of resources. The sensor measurement may include, for instance, a range or time-of flight measurement, a direction of arrival measurement, a range or time difference measurement, etc. As introduced above, power (e.g., battery power) is one example in which the less power that is consumed the better. In some examples, the resource is availability of the radio frequency spectrum. For example, government regulations may limit the maximum or average amount of energy that a set of transmitters may emit over time and/or over frequency for localization and navigation. In some examples, the resource is a computation resource related to the computation capacity available to process a sensor signal to make a sensor measurement.

In some examples, a resource may be applied to making a sensor measurement in a variable manner such that when the more the resource is applied to making the measurement, the more information is obtained from the measurement. In some radio frequency ranging approaches, the more power that is transmitted, the more accurate a sensor measurement is made using the transmitted signal. This variable amount of the resource (e.g., power) may be controlled, for example, according to a gain applied to the transmitted signal, a duration of the signal, and/or a bandwidth of the signal. As another example, the amount of computation (e.g., amount of time, number of processors, etc.) applied to making the range measurement from a ranging signal may be variable, with more computation generally providing a more accurate range measurement. For example, a computation may make use of a longer or shorter duration of a ranging signal, or a wider or narrower bandwidth of a ranging signal, thereby increasing or reducing the computation resource applied to making the range measurement. In some examples, the amount of information that is obtained from a measurement relates to variance of the range estimate.

In some examples, the utility of a sensor measurement is further affected by environmental characteristics, for instance, that may characterize a channel quality. As an example, in the case of a radio frequency ranging system, the longer the distance between a transmitter and a receiver, the lower the delivered energy (e.g., falling off as the square or cube of the distance), and the lower the information that may be obtained from a measurement. Other characteristics than distance may affect the utility. For example, a radio signal may have to traverse through a wall, which attenuates the signal, or a particular satellite signal may have to pass though vegetation because the satellite is close to the horizon or the GPS receiver is under a vegetation. Therefore, in some example, the channel quality may be determined based on locations of transmitters and receivers, while in other examples, the channel quality itself must be estimated.

In localizing an device (e.g., a robot, a GPS receiver) in an two- or three-dimensional space, knowledge of the current location of the device may be represented by a distribution over space. For example, the distribution may be a probability distribution or a scaled version of a probability distribution. In some examples, this probability distribution may be represented by a mean and a covariance of a two- or three-dimensional Gaussian distribution. In some examples, the covariance is represented by its inverse, which may be referred to as the precision or information matrix. In general, the current knowledge of location may be more accurate in some directions than others (i.e., the uncertainty is direction-dependent). For example, the north-south location of a robot may be much more accurately known than its east-west location.

A single range measurement in a particular direction provides new information about the location of the device along a line in that direction, and generally no information about the location of the device at right angles to that direction. When combined with the past information of the location of the device, a new distribution will in general have a different shape. For example, in the case of a robot where the east-west location is known less accurately than its north-south location, a range measurement relative to a reference that is due east may improve the east-west accuracy much more than a range measurement from a reference that is due north. Therefore, in allocating resources to range measurements, it can be important to consider the direction-dependent characteristics of the information that will be gleaned from any particular measurement to be made, and how those direction-dependent characteristics relate to the direction-dependent characteristics of the distribution of the location for the device.

In one aspect, in general, a method for localizing one or more devices in an environment make use of repeated allocation of resources for one or more sensor measurements. Each sensor measurement is characterized by the amount of resources allocated to the measurement, by a quality factor, and by direction-dependent characteristics of information that is obtainable from that sensor measurement. Knowledge of a location of each of the one or more devices determined from past sensor measurements is characterized by a distribution, with each of distribution containing information about the current location of the device, including the direction-dependent information and/or the uncertainty of the location. For example, the direction-dependent information may characterize the uncertainty of the location in different directions. The allocation of resources makes use of the quality factors and characteristics of the sensor measurements which may provide information about different directional components of the a device's location, in combination with the distributions characterizing the knowledge of the current location of each of the one or more devices to allocate a variable amount of a resource to each of the one or more sensor measurements. It should be understood that allocating a "variable amount" excludes merely making a binary decision to use a set amount of the resource (i.e., a decision to select the sensor measurement), and that "variable amount" means that the amount can be chosen from a continuous range or a set of multiple values (other than zero or non-selection of the sensor measurement).

The sensor measurements may be made according to the allocation of resources, and the distributions characterizing the locations of the one or more devices are updated using the sensor measurements. The allocation of resources is then repeated for a further one or more sensor measurements.

In another aspect, localization of a device using the approaches outlined above is performed as part of a navigation task in which the knowledge of a device's location determined from the sensor measurements is applied to planning and executing a path for the device through an environment.

DETAILED DESCRIPTION

Overview

A number of examples are provided in this document that deal with localization of one of more devices, typically mobile devices that move over time in an environment, for instance, on a factory floor. The approaches are applicable to a wide variety of devices, including without limitation to robots, personal electronic devices, and/or manned or unmanned vehicles. In general, a device whose location is not known is referred to below as an "agent". In general (but not necessarily), the environment includes one or more fixed or known location devices, which are generally referred to as "anchors," and the agents are localized relative to the anchors.

Localization of the agents makes use of sensor measurements. In a number of the examples described below, these measurements are range measurements that characterize a distance between an agent and an anchor or a distance between two agents. The techniques described are not specific of a particular sensor technology. However, for the sake of illustration, the range measurements are more particularly range measurements using time-of-flight using ultra-wideband radio frequency emissions from the agents and/or anchors.

Figure 1:
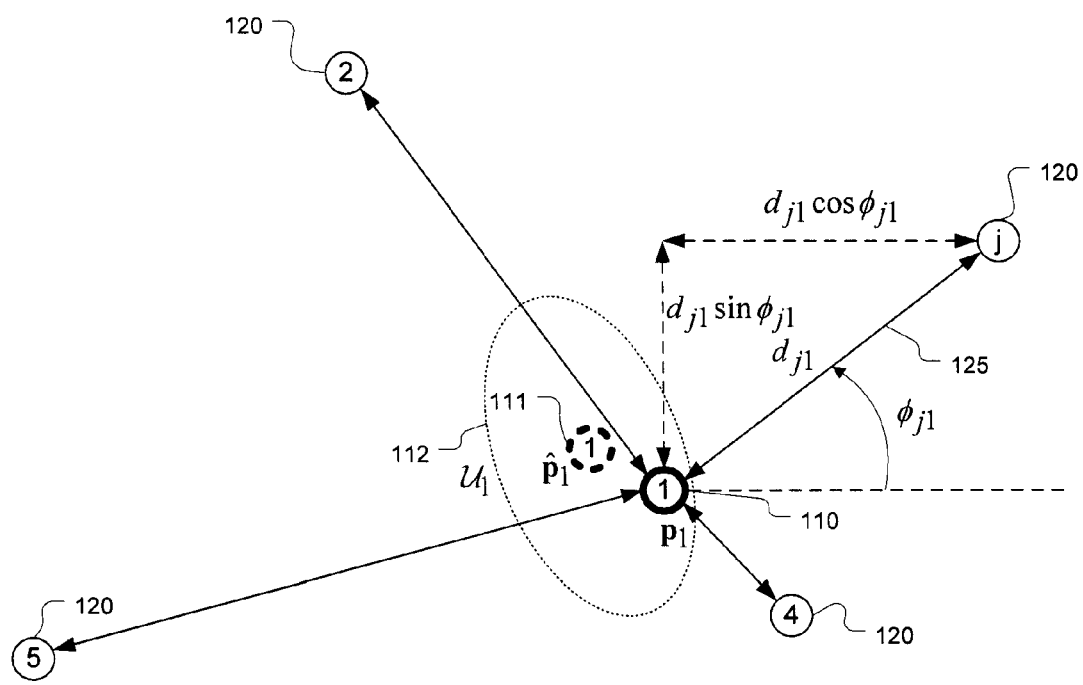
FIG. 1 is a diagram illustrating a single agent and a set of four anchors used to localize the agent.

Referring to FIG. 1, in an example in which there is a single agent 110 (labeled with the integer 1) and a number of anchors 120 (labeled with integers 2 through 5, with a representative anchor labeled j). Very generally, the agent 110 makes a range measurement, for example between it and an anchor 120*j*. There are several characteristics of this measurement.

The first characteristic is that as a consequence of factor including the sensing technology, the environment, and/or the relative positions of nodes, a sensor measurement has an uncertainty, which can be quantified in terms of a standard deviation or a variance. Therefore, although the agent may make range measurement $z_{j1}$, the true range is $d_{j1}$ such that $$z_{j1} = d_{j1} + w_{j1}$$

where $w_{j1}$ is the range error, for example modeled as a zero-mean Gaussian random variable (RV) with variance $\sigma_{j1}^2$.

The second characteristic is that making the measurement consumes an amount of a resource, represented as $x_{j1}$. As an example, this resource may be an amount (i.e., a selection from a continuous or discrete set of multiple possible values) of energy (e.g., Joules, Watt-Seconds, etc.). As discussed below, the cumulative use of this resource is controlled in examples described below.

A third characteristics is that there is a functional relationship between the resource used to make a measurement, $x_{j1}$, and the uncertainty of the measurement represented using the variance $\sigma_{j1}^2$. This certainty for the measurement may be represented as the "information" as $J=1/\sigma_{j1}^2$. In an number of the examples described below, the relationship between the information and the resource used is linear such that $$J = \frac{1}{\sigma_{j1}^2} = \xi_{j1} x_{j1}$$

The term $\xi_{j1}$ can be interpreted as a "channel quality", which may be measured or estimated at and agent or anchor node.

A fourth characteristic of a range measurement $z_{j1}$ characterizing the true range $d_{j1}$ is that the agent 110 is at a location $p_1$, which is represented as a vector (e.g., in two-dimensional space) while the range measurement is a scalar quantity. In FIG. 1, the vector location is illustrated as being in two dimensions, but it should be recognized that the examples provided below using two dimensions are equally applicable to three dimensions. Based on the geometry of the situation, generally referring to the axis across the page as the "x-axis" and the axis vertically on the page as the "y-axis", the anchor 120 is at an angle $\phi_{j1}$ relative to the x-axis from the agent 110, the x-axis component of the range is $d_{j1} \cos \phi_{j1}$ and the y-axis component is $d_{j1} \sin \phi_{j1}$. Based on this observation, a two-dimensional information that the range measurement provides for the two components is represented as $$J_{j1} = R(\phi_{j1})\xi_{j1}x_{j1}$$

where $R(\phi) = [\cos \phi \ \sin \phi]^T [\cos \phi \ \sin \phi]$.

A fifth characteristic of a range measurement is that when a measurement is made, the actual location of the agent, $p_{j1}$, is not actually, known, and therefore $\phi_{j1}$ is also not actually known either. Rather, the agent knows its estimated locations $\hat{p}_1$, illustrated as position 111 in FIG. 1. Furthermore, as illustrated in FIG. 1, the agent knows or has a current estimate of a confidence region $\mathscr{U}_1$ around the estimated position $\hat{p}_1$, such that the true position $p_{j1}$ is within the confidence region with high probability. The approach to determining the confidence region is described in more detail below. The shape of the confidence region is generally ellipsoidal.

Because the actual location is not known to the agent, and because as will be shown below, certain computations and/or resource allocation decisions depend on $J_{j1}$ (which is unknown because $\phi_{j1}$ is unknown), the confidence region is taken into account in such computations and decisions. For example, effectively all points $p_1 \in \mathscr{U}_1$ (or an approximation, for example, based on sampling points in that region or the range or extent of the region) are used in a number of the examples. In the examples below, the information dependent on a particular true location of an agent is denoted $J_1(p_1)$.

A final characteristic of a set of range measurements is that the informations from measurements to multiple anchors sum such that $$J_1(p_1) = \sum_j R(\phi_{j1})\xi_{j1}x_{j1}$$

where the sum over j is over the anchors, with the resource applied to the measurement to that anchor having been set at $x_{j1}$. The dependence of this information of $p_1$ represents the fact that the angles $\phi_{j1}$ depend on $p_1$.

In the description that follows, three primary examples are described. These examples are characterized by:
1. a single agent, or equivalently multiple agents all acting independently;
2. multiple agents with a centralized procedure used to globally allocate the resource for measurements between agents and anchors; and
3. multiple agents, adding measurements between agents in a centralized procedure to allocate the resource.

Of course, these are not the only examples, but they serve to illustrate a number of aspects of the approach that are applicable to a wider range of examples.

EXAMPLE 1

Single Agent Localization

In this first example, a situation as illustrated in FIG. 1 is addressed in which there is a single agent 110 and a number of anchors 120 at known locations. The localization procedure proceeds in a number of time "slots", generally indexed sequentially using the variable n associated with successive times $t_n$. Quantities associated with a time slot n are generally denoted by a superscript $^{(n)}$, which may be omitted when it is evident from the context. Therefore, the problem solved by the agents is, at time slot n, allocation of measurement resources $x_{j1}^{(n)}$ for all the anchors j to make a "best" set of measurements to improve its estimate of its location after making those measurements. Then, generally, the agent makes the measurements, and updates its knowledge of its location using the measurements, and proceeds to the next time slot.

More precisely, the set $\mathscr{N}_a = \{1,2,\ldots,N_a\}$ denotes the set of agents and in this example in which there is a single agent, $\mathscr{N}_a = \{1\}$ (i.e., $N_a=1$), and $\mathscr{N}_b = \{N_a+1, N_a+2, \ldots, N_a+N_b\}$ denotes the set of anchors. The position of agent 1 at time $t_n$ is denoted by $p_1^{(n)}$. More generally, the location of a node k (either an agent or an anchor, which should be evident from the context) is denoted by $p_k^{(n)}$. Consistent with the Overview above, $\phi_{jk}^{(n)}$ and $d_{jk}^{(n)}$ denote the angle and distance, respectively, from node k to node j at time $t_n$.

As discussed more fully below, in general, the energy allocation strategy $x^{(n)}$ (a vector of the allocations $x_{jk}$) is determined based on the position estimates $\hat{p}^{(n_0)}$ ($0 \leq n_0 \leq n$). Similarly, the position estimates may depend on the energy allocation policies $x^{(n_0)}$ ($0 \leq n_0 \leq n$). In this way, the joint energy allocation and position estimation algorithms can run iteratively in the navigation process.

As introduced above, if the position of the agent were known, then the total information available to determine the location of the agent based on a resource allocation would be $$J_1(p_1) = \sum_j R(\phi_{j1})\xi_{j1}x_{j1}$$

The criterion that is used to evaluate of the total information is the trace of the inverse of the information matrix, denoted $\text{tr}\{J(p_1)^{-1}\}$. It should be evident that this trace generally decreases as J increases and as the variance, $\sigma_{j1}^2$ of the measurement error decreases. That is, in general, the smaller the trace the more accurate the position estimate will be. Therefore, if the position $p_1$ were known, then the allocation of resources could be represented as $$\{x_{j1}\}_{j\in\mathscr{N}_b} = \underset{x_{j1}|_{j\in\mathscr{N}_b}}{\text{argmin}} \, \text{tr}\{J_1(p_1)^{-1}\}$$

$$= \underset{x_{j1}|_{j\in\mathscr{N}_b}}{\text{argmin}} \, \text{tr}\left\{\left(\sum_{j=1,\ldots,N_b} R(\phi_{j1})\xi_{j1}x_{j1}\right)^{-1}\right\}$$

The allocation of resources is constrained. In some examples, the constraint is a sum $\sum_j x_{j1} \leq x_{max}$ and each $x_{j1} \geq 0$. More generally, the resources allocation must satisfy a set of affine functions of the resource allocation variables.

Also as introduced above, rather than the position $p_1$ being known, it is assumed unknown but in a confidence region $\mathscr{U}_1$. In general, the resource allocation is determined according to the "worst case" position in the confidence region as $$\{x_{j1}\}_{j\in\mathscr{N}_b} = \underset{x_{j1}|_{j\in\mathscr{N}_b}}{\text{argmin}} \, \underset{p_1 \in \mathscr{U}_1}{\max} \, \text{tr}\{J_1(p_1)^{-1}\}$$

After determining the resource allocation according to this minimization, the agent makes the measurements and obtains the range measurement $z_{j1}$. It then updates its position estimate to minimize a variance-weighted squared error $$\hat{p}_1^{(n)} = \underset{p}{\mathrm{argmin}} \sum_j \frac{(z_{j1}^{(n)} - \|p_j - p\|)^2}{\sigma_{j1}^2}$$
$$= \underset{p}{\mathrm{argmin}} \sum_j \xi_{j1}^{(n)} x_{j1}^{(n)} (z_{j1}^{(n)} - \|p_j - p\|)^2$$

where $p_j$ is the location of anchor j, and the sum is over the anchors to which the agent has made range measurements $z_{j1}$.

The agent also updates the confidence region $\tilde{\mathcal{U}}_1^{(n)}$ as $$\tilde{\mathcal{U}}_1^{(n)} = \{p: (p-\hat{p}_1^{(n)})^T J_1(p_1)(p-\hat{p}_1^{(n)}) \leq c\}$$

for a fixed constant c and with $p_1$ in $J(p_1)$ substituted with $\hat{p}_1$.

Before the start of the next time slot, the $\mathcal{U}_1$ is updated to account for possible movement of the agent between time steps. In this example, the new confidence region is set to be $$\mathcal{U}_1^{(n+1)} = \{p: \|p-p_1\| \leq \Delta,\ p_1 \in \tilde{\mathcal{U}}_1^{(n)}\}$$

and the procedure for the next time slot is begun again as described above.

In a variant of this example where there are $N_a > 1$ agents working separately, each independently performs the same procedure described above.

Figure 2:
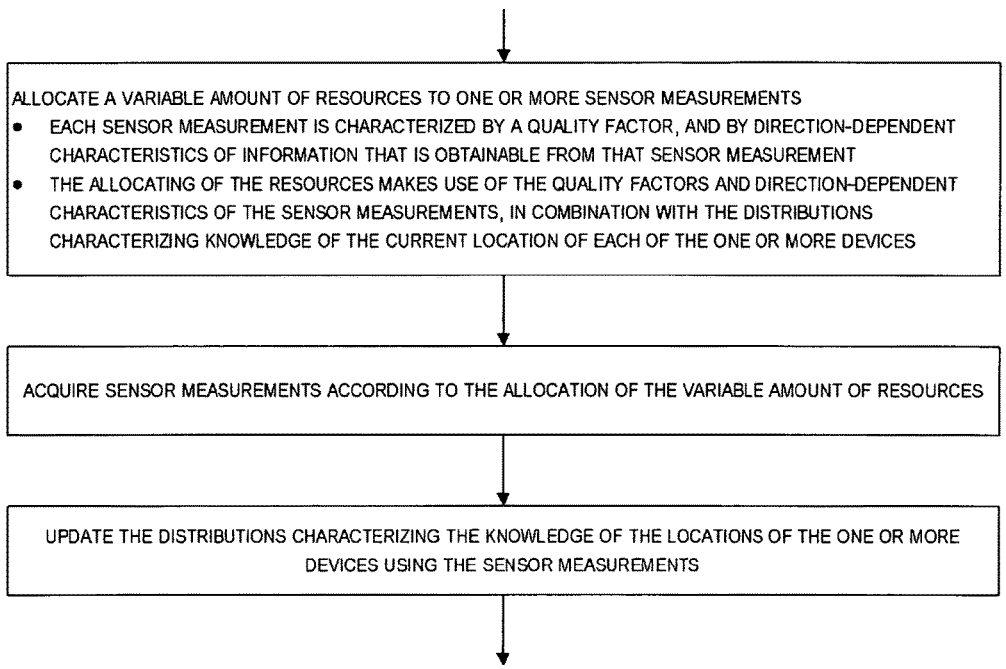
FIG. 2 is a flowchart.

The procedure described above may be summarized by the flowchart shown in FIG. 2.

EXAMPLE 2

Centralized Allocation of Resources

In the first example, each agent acts independently. In this second example, the constraints for resource allocation may be coupled among the agents. As a simple example, if there are two agents, with indices 1 and 2 (i.e., $N_a = 2$). One approach to addressing this situation is to consider a representation of the information of all the agent location based on the measurements in matrix form as:

$$J = \begin{bmatrix} J_1 & 0 \\ 0 & J_2 \end{bmatrix}$$

omitting the notation on the dependence of the terms on $p_1$ and $p_2$. The joint optimization considers the $N_a$ confidence regions, and the goal is to minimize the worst-case location errors for all the confidence regions. The resource constraints can be crossed or independent among agents, as long as they are affine or convex constraints.

The situation with $N_a > 2$ agents is handled similarly, with J being block diagonal with $N_a$ blocks.

EXAMPLE 3

Measurements Between Agents

In this third example, agents make measurements to anchors as well as to other agents. Recall that when an agent k makes a measurement to anchor i applying a resource $x_{jk}$, it gains information about its location, expressed as $$J_{jk} = R(\phi_{jk}) \xi_{jk} x_{jk}$$

In the case of two agents, also indexed j and k, agent k has allocated a resource $x_{jk}$ to the measurement, and agent j has allocated resource $x_{kj}$. The information obtained from the two measurements about the difference in the two agents locations can be expressed as $$C_{jk} = R(\phi_{jk})(\xi_{jk} x_{jk} + \xi_{kj} x_{kj})$$
$$= C_{kj}$$

In an example in which there are exactly two agents, the information about the locations of both the agents can be expressed as $$J = \begin{bmatrix} J_1 + C_{1,2} & -C_{1,2} \\ -C_{2,1} & J_2 + C_{2,1} \end{bmatrix}$$

For more than two agents, diagonal block k has the form $$J_k + \sum_{j \in N_a, j \neq k} C_{k,j}$$

and each off diagonal (j, k) block has the form $-C_{j,k}$.

A confidence region for an agent k is determined according to an information matrix $$J_k^e = ([J^{-1}]_k)^{-1}$$

where $[\ ]_k$ is the $k^{th}$ diagonal block.

As introduced above, the confidence region given the J matrix is computed as $$\tilde{\mathcal{U}}_k^{(n)} = \{p: (p-\hat{p}_k^{(n)})^T J_k^e(p_k)(p-\hat{p}_k^{(n)}) \leq c\}$$

for a fixed constant c, and then for the start of the next time step, as introduced above, the confidence is updated, for instance as $$\mathcal{U}_k^{(n+1)} = \{p: \|p-p_k\| \leq \Delta,\ p_k \in \tilde{\mathcal{U}}_k^{(n)}\}$$

One approach to handling allocation of resources in this situation in which agents make measurements both to the anchors as well as to the other agents is to minimize the trace $\mathrm{tr}\{J^{-1}\}$ over the resource allocation, including for robustness considering the worst case agent locations within their respective confidence regions.

In an alternative approach, each time step has two phases. Generally, in the first phase of time slot n each agent k makes range measurements to the anchors using a procedure described above in Examples 1 and 2 using its confidence region $\mathcal{U}_k^{(n)}$. This yields updated confidence regions $\tilde{\mathcal{U}}_k^{(n)}$ for each of the agents k.

$$\tilde{\mathcal{U}}_k^{(n)} = \{p: (p-\hat{p}_k^{(n)})^T J_k(p_k)(p-\hat{p}_k^{(n)}) \leq c\}$$

The agents exchange their updated position estimates.

In the second phase (cooperation phase), each agent k determines the transmission power from agent k to other agents by solving the following optimization problem (using the updated confidence regions):

$$\min_{x_{jk}^{(n)} \geq 0, p_k^{(n)} \in \tilde{\mathcal{U}}_k^{(n)}} \max \ \mathrm{tr}\{[Q_k^e(p_k^{(n)})]^{-1}\}$$

where $$Q_k^e(p_k^{(n)}) = J_k(p_k^{(n)}) + \sum_{j \in N_a, j \neq k} x_{jk}^{(n)} \chi_{jk}^{(n)} R(\phi_{jk}^{(n)})$$

in which $$\chi_{jk}^{(n)} = \xi_{jk}^{(n)} / (1 + x_{jk}^{(n)} \xi_{jk}^{(n)} \mu_{jk}^{(n)})$$

$$\mu_{jk}^{(n)} = tr\{[J_j(p_j^{(n)})]^{-1} \cdot R(\phi_{jk}^{(n)})\}.$$

The agents then make the inter-agent measurements, and then update the position estimate as $$\hat{p}_k^{(n)} = \underset{p}{\operatorname{argmin}} \Big[ \sum_{i \in \mathcal{R}_k} x_{jk}^{(n)} \zeta_{jk}^{(n)} (z_{jk}^{(n)} - \|p - p_j^{(n)}\|)^2 + \sum_{i \in \mathcal{M}} x_{jk}^{(n)} \chi_{jk}^{(n)} (z_{jk}^{(n)} - \|p - \hat{p}_j^{(n)}\|)^2 \Big]$$

The agent updates its confidence region using the new position estimate as described above:

$$\tilde{\mathcal{U}}_k^{(n)} = \{p : (p - \hat{p}_k^{(n)})^T J_k^e(p_k)(p - \hat{p}_k^{(n)}) \le c\}$$

for a fixed constant c, and then for the start of the next time step, as introduced above, the confidence is updated, for instance as $$\mathcal{U}_k^{(n+1)} = \{p : \|p - p_k\| \le \Delta, \ p_k \in \tilde{\mathcal{U}}_k^{(n)}\}$$

Alternatives

In the procedures outlined above, robustness to unknown locations of the agents is addressed by certain maximizations over locations within an agent's confidence region $\mathcal{U}_k$. An alternative to considering all points in the region is to sample the region at N points, and then to use the maximum (or other function such as the average) over the sampled points.

In the description above, a new set of position estimates at time slot n are determined from the measurements $z_{jk}^{(n)}$ at that time step alone. In alternative examples, the new measurements are combined with information from past measurements. There are two modifications in order to combine the information from past measurements. First, the maximum likelihood position estimate is slightly modified (adding one term that characterizes the past information). Second, the information matrix $J_1(p_1)$ is also modified (adding one matrix that characterizes the past location information).

As introduced in the Summary, the allocation of resources at a time step may depend on the confidence region such that the incremental information that may be obtained from the measurements enters into the resource allocation decision.

The discussion above include a description of application of a transmission power (e.g., to a radio frequency or optical signal emitted between node) to a sensor measurement. It should be understood that the power allocated to a transmitted signal may depend on a combination of one or more of the signal duration, the signal bandwidth, and power density across time and/or frequency. Other forms of resources that can be allocated according to the techniques described above include computation resources. For example, in making a range estimate, in some cases applying more computation resources may yield a more accurate estimate. As an example, using a longer signal in which to detect a known signal may yield a higher accuracy but may require more computation to correlate an acquired signal with the known signal.

Implementations

Implementations of the approaches described above may use software, which is stored on a non-transitory machine-readable medium, for causing processors (e.g., instruction controller circuitry) at the agents, anchors, and/or server computers in communication with the anchors and/or agents to perform the computation and/or perform or cause performance of the sensor measurement procedures described above. This software may include instructions (e.g., machine instructions, high-level programming language instructions, virtual machine bytecode, etc.) for execution by a physical or virtual machine. Some implementation may include hardware components that include special-purpose circuitry (e.g., Application Specific Integrated Circuits, ASICs) for performing some of the functions.

What is claimed is:

1. A method for localizing one or more devices in an environment using location knowledge for each device of the one or more devices, location knowledge of each device being characterized by a distribution determined from past sensor measurements, wherein each distribution represents information about a current location of the device, including the direction-dependent information and the uncertainty of the location, the method comprising:

allocating a variable amount of resources to one or more sensor measurements, wherein each sensor measurement of the one or more sensor measurements is characterized by a quality factor, and by direction-dependent characteristics of information that is obtainable from that sensor measurement for devices of the one or more devices, and wherein the allocating of the resources makes use of the quality factors and direction-dependent characteristics of the sensor measurements, in combination with the distributions characterizing knowledge of the current location of each of the one or more devices;

acquiring sensor measurements according to the allocation of the variable amount of resources; and updating the distributions characterizing the knowledge of the locations of the one or more devices using the sensor measurements.

2. The method of claim 1 further comprising maintaining the location knowledge for each device of the one or more devices.

3. The method of claim 1 wherein the one or more devices comprise mobile robot devices.

4. The method of claim 1 wherein the one or more devices comprise portable personal electronic devices.

5. The method of claim 1 wherein the one or more devices comprise a portable positioning system receiver.

6. The method of claim 1 wherein the sensor measurements comprise range measurements.

7. The method of claim 6 wherein the range measurements comprise radio frequency propagation time measurements.

8. The method of claim 7 wherein the quality factor characterizes a signal quality.

9. The method of claim 8 further comprising estimating the quality factor from prior transmissions of radio frequency signals.

10. The method of claim 6 wherein the direction-dependent characteristics of information obtainable from a sensor measurement depend on a direction in which the range measurement is made.

11. The method of claim 4 wherein the one or more devices comprises a first device, and wherein the one or more sensor measurements comprise range measurements between the first device and a plurality of other devices.

12. The method of claim 11 wherein the plurality of other devices comprises a plurality of devices with known locations.

13. The method of claim 12 wherein the plurality of other devices further comprises devices of the one or more devices.

14. The method of claim 1 wherein acquiring a sensor measurement comprises emitting a signal.

15. The method of claim 14 wherein emitting the signal comprises emitting the signal with a power determined according to the amount of resources allocated to the sensor measurement.

16. The method of claim 1 wherein the variable amount of a resource allocated to a sensor measurement comprises a variable amount of power applied to a sensor measurement.

17. The method of claim 1 wherein acquiring a sensor measurement comprises receiving a signal.

18. The method of claim 1 wherein the variable amount of a resource allocated to a sensor measurement comprises a variable amount of a computation resource applied to processing the received signal.

19. The method of claim 1 wherein the distribution representing information about a current location of the device includes a representation of a confidence region within which the device is likely to be located.

20. The method of claim 19 wherein the confidence region comprises a substantially elliptical or ellipsoidal region.

21. The method of claim 19 wherein the confidence region characterizes a direction-dependent range of location.

22. A device configured to maintain location knowledge characterized by a distribution determined from past sensor measurements, wherein the distribution represents information about a current location of the device, including the direction-dependent information and the uncertainty of the location, the device including a processor and stored instructions for causing the processor to:
   allocate a variable amount of resources to one or more sensor measurements,
      wherein each sensor measurement of the one or more sensor measurements is characterized by a quality factor, and by direction-dependent characteristics of information that is obtainable from that sensor measurement for devices of the one or more devices, and
      wherein the allocating of the resources makes use of the quality factors and direction-dependent characteristics of the sensor measurements, in combination with the distributions characterizing knowledge of the current location of the device;
   acquire sensor measurements according to the allocation of the variable amount of resources; and
   update the distributions characterizing the knowledge of the location of the device using the sensor measurements.

23. Software stored on a non-transitory machine readable medium comprising instructions for causing a processor of a device to:
   maintain location knowledge characterized by a distribution determined from past sensor measurements, wherein the distribution represents information about a current location of the device, including the direction-dependent information and the uncertainty of the location;
   allocate a variable amount of resources to one or more sensor measurements,
      wherein each sensor measurement of the one or more sensor measurements is characterized by a quality factor, and by direction-dependent characteristics of information that is obtainable from that sensor measurement for devices of the one or more devices, and
      wherein the allocating of the resources makes use of the quality factors and direction-dependent characteristics of the sensor measurements, in combination with the distributions characterizing knowledge of the current location of the device;
   acquire sensor measurements according to the allocation of the variable amount of resources; and
   update the distributions characterizing the knowledge of the location of the device using the sensor measurements.

* * * * *